(12) United States Patent
Horner et al.

(10) Patent No.: US 7,930,969 B1
(45) Date of Patent: Apr. 26, 2011

(54) BRAKE BOOSTER WITH DUAL RATE ASSIST

(75) Inventors: Charles Horner, South Bend, IN (US); Robert Spaargaren, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 492 days.

(21) Appl. No.: 12/183,411

(22) Filed: Jul. 31, 2008

(51) Int. Cl.
*B60T 13/575* (2006.01)
*B60T 13/52* (2006.01)
(52) U.S. Cl. ..................... 91/369.2; 91/369.1
(58) Field of Classification Search ........... 91/369.1, 91/369.2, 376 R; 303/114.3
See application file for complete search history.

(56) References Cited

U.S. PATENT DOCUMENTS

| 5,012,723 | A | 5/1991 | Gauthier | |
|---|---|---|---|---|
| 6,494,125 | B2 | 12/2002 | Hannus et al. | |
| 6,802,240 | B2 * | 10/2004 | Kobayashi | 91/369.2 |
| 7,100,997 | B2 * | 9/2006 | Berthomieu et al. | 91/369.2 |
| 2006/0112819 | A1 | 6/2006 | Tsubouchi | |

FOREIGN PATENT DOCUMENTS

| EP | 1538050 | 6/2005 |
|---|---|---|
| FR | 2850343 | 7/2004 |
| FR | 2857641 | 1/2005 |

OTHER PUBLICATIONS

International search report in corresponding PCT application (i.e. PCT/US2009/052106), mailed Oct. 15, 2009 (4 pages).

* cited by examiner

*Primary Examiner* — Thomas E Lazo
(74) *Attorney, Agent, or Firm* — Maginot, Moore & Beck

(57) ABSTRACT

A boosted brake having a booster with a decompression arrangement wherein an output push rod has a head with a plurality of openings that extend into a stem and create a plurality of arcuate grooves. The openings receive a plurality of projections that extend from a piston retained in a sleeve held in a movable partition. A spring acts on the projections and urges the piston into engagement with a reaction disc through which an actuation force is supplied a master cylinder. A predetermined reaction force from the master cylinder acts on piston and overcomes the spring to allow the reaction disc to expand and thereby modify the reaction force. The arcuate grooves in the stem allow for a maximum diameter for spring with a minimum diameter for stem that corresponds to a diameter of piston in order to creates a desired braking in response to an emergency brake application.

7 Claims, 2 Drawing Sheets

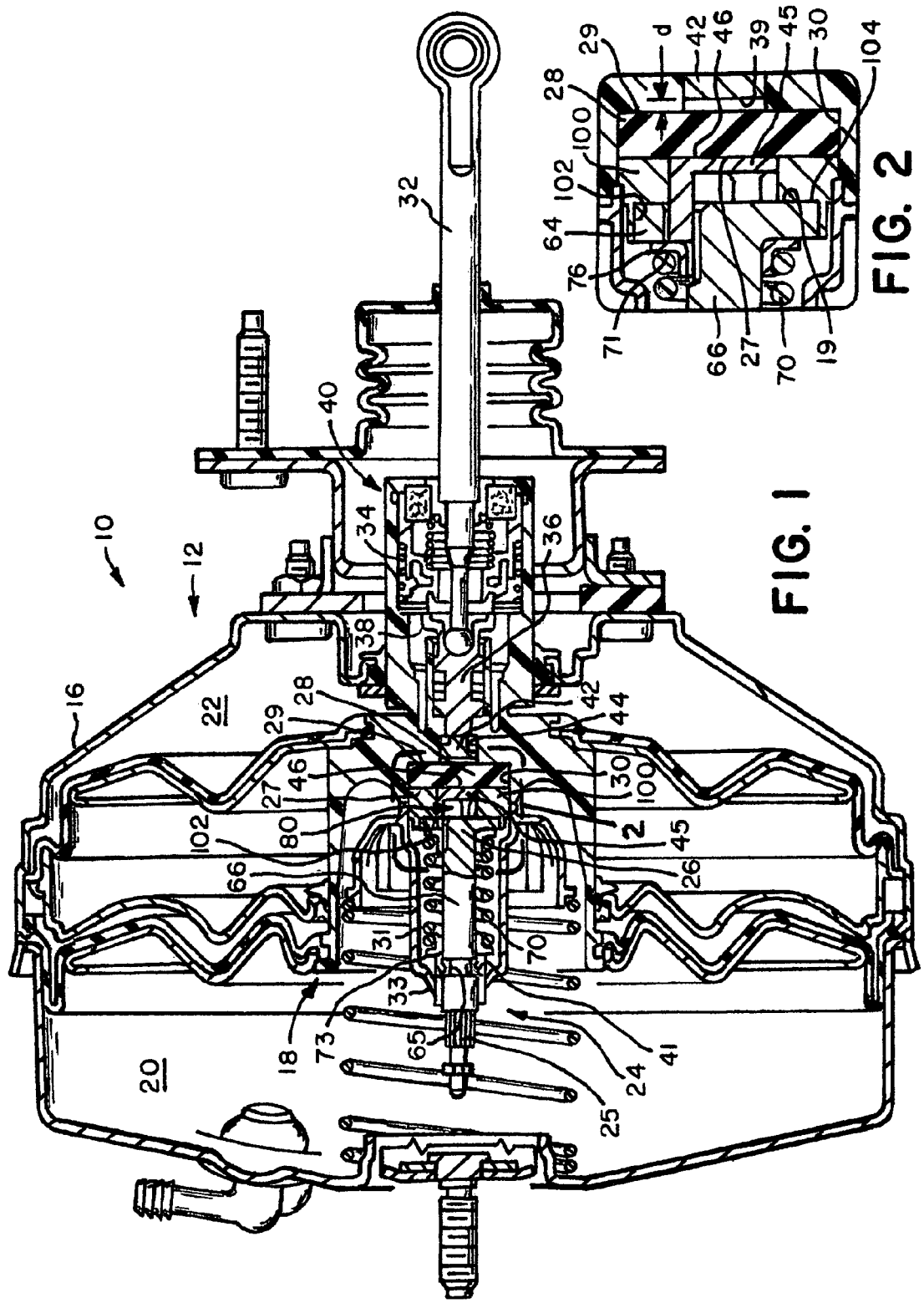

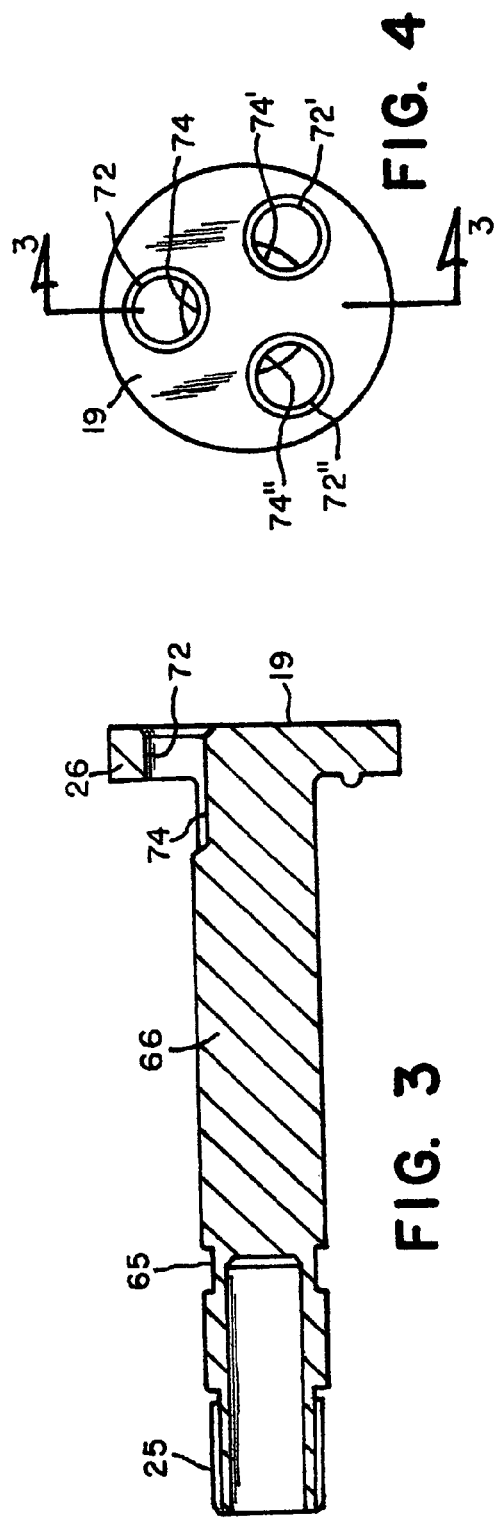
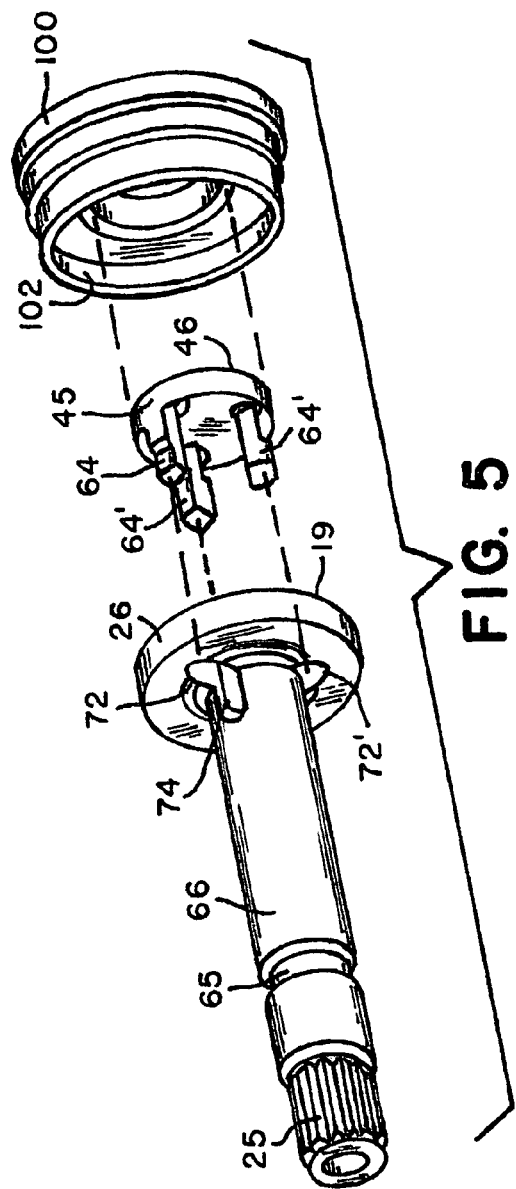

BRAKE BOOSTER WITH DUAL RATE ASSIST

BACKGROUND OF THE INVENTION

The invention relates to a brake booster for a motor vehicle.

Boosted brakes such as disclosed in U.S. Pat. Nos. 6,494,125 and 7,100,997 for use in a motor vehicle commonly comprise a pneumatic brake booster for actuating a master cylinder. The brake booster usually has a rigid casing in which a transverse partition that sealably delimiting a front chamber subjected to a first pressure from a rear chamber subjected to a second pressure varying between the first pressure and a pressure greater than the first pressure causing corresponding movement. The brake booster has a moving piston fixed to the moving partition that has a front face which acts on a primary piston of the master cylinder by way of a reaction disc retained in a cage. The cage is located between the moving piston and the primary piston and is connected to a control rod which selectively moves in the piston as a function of an axial input force exerted against a return force acting on the control rod by a return spring. A first plunger arranged in front of the control rod in the piston has a rear end with at least one annular rear seat for a three-way valve. The three-way valve progressively moves between a first position in which, with the control rod at rest, the front chamber and the rear chamber are in communication, and a second position in which, with the control rod actuated, the second pressure prevailing in the rear chamber increases. The three-way valve places the rear chamber in communication with the pressure which is greater than the first pressure to effect a brake application. A feeler defined by a second plunger is located on the front end of the first plunger passes through a bore leading from the piston and the control rod and in the rest position, the second plunger is arranged at a defined distance from the reaction disc. When the control rod is actuated with an input force whose intensity is greater than a first defined intensity moves the feeler or second plunger into contact with the reaction disc and as a result a reaction force from the master cylinder is transmitted into the first plunger and the control rod. The ratio of the area of the reaction disc in contact with the cage to the area of the feeler or second plunger in contact with the reaction disc defines a first defined boost ratio. The cage comprises at least one moving decompression wall which, when the control rod is actuated with an input force whose intensity is greater than a second defined intensity greater than the first moves so as to create in the cage an additional volume in which a front part of the reaction disc expands to reduce the reaction force transmitted to the feeler or second plunger by way of the rear face of the reaction disc. The ratio of the area of the reaction disc in contact with the cage to the area of the feeler or second plunger in contact with the reaction disc defining a second boost ratio, which is greater than the first boost ratio.

In the boosted brake disclosed in U.S. Pat. No. 7,100,997, the moving decompression wall forms part the cage that is located between the reaction disc and the primary piston of the master cylinder. The cage has a housing with a first face attached to the reaction disc and a passage to retain a cylindrical decompression piston in contact with the reaction disc substantially along the axis of the plunger. The decompression piston is elastically urged toward the reaction disc by a helical spring which is housed inside the housing and the helical spring that has substantially the same diameter as the decompression piston. When the intensity of the input force exceeds the second defined value, the decompression piston is pushed back in the housing, compressing the helical spring to create a free volume that allows the reaction disc to be further decompressed and limit the ratio of the input force in the development of a corresponding output force.

While this type of decompression wall has many advantages it unfortunately has a disadvantage in terms of space requirement. Specifically, this design entails the use of a helical spring that has substantially a same diameter as the decompression piston. In is impossible to reduce the diameter of the helical spring without reducing the diameter of the decompression piston and as a result an appropriate surface area for creating in the cage a decompression volume would not be sufficient to bring about suitable decompression of the reaction disc. Further, a reduction in the size of the helical spring may not create a force that is capable to move the push rod located between the cage and the primary piston of the master cylinder in a desirable manner.

SUMMARY OF THE INVENTION

The current invention provides means whereby a relatively large helical spring may be caged on an output push rod and a decompression piston having a relative large surface area may create a suitable decompression volume for a reaction disc to expand in response to a predetermined input force.

In the brake booster, a push rod is modified and interposed between the reaction disc and the primary piston of the master cylinder. The push rod engages a cylindrical member having a rear face that contacts with the reaction disc and in which an axial opening through which a matching decompression piston, of a defined transverse size is retained in a sleeve or cylindrical body. The decompression piston has a plurality of radial branches that extend through corresponding bores in the head of the push rod while a rear face thereon forms a decompression wall. The ends of the radial branches engage a bearing washer that essentially has a same diameter as the decompression piston and allow the decompression piston to have a maximum transverse size while the push rod has a minimum diameter. The face on the head of the output push rod forms an axial stop for the decompression piston while a helical return spring is caged between the bearing washer and a retainer that is staked in a groove on the output push rod. The bearing washer has an outside diameter corresponding to that of the bore of the front section of the movable wall and has an inside diameter corresponding to the diameter of the decompression piston. The crimping of the retainer into the groove of the output push rod defines a variable axial position to allow the preload of the helical spring to be adjusted. The decompression piston includes three branches distributed angularly in a regular manner and located on arcuate axial borings on the output push rod such that the helical spring size may remain in a desired relationship with respect to a surface area on the decompression piston. The three branches of the decompression piston allow the push rod to press on the primary piston of the master cylinder.

BRIEF DESCRIPTION OF THE DRAWINGS

FIG. 1 is a view in axial section of a boosted brake according to the invention;

FIG. 2 is an enlarged view of an axial section of a portion of the boosted brake of FIG. 1;

FIG. 3 is a sectional view of an output push rod for the boosted brake of FIG. 1;

FIG. 4 is a view taken along line 4-4 of FIG. 3; and

FIG. 5 is an exploded perspective view of the push rod, decompression piston and cylindrical body for retaining the decompression of FIG. 1.

DETAILED DESCRIPTION OF THE INVENTION

By convention, the terms "front" "rear" "upper" and "lower" respectively denote elements or positions which are respectively directed toward the left, the right, the top or the bottom of the figures.

FIG. 1 illustrates a boosted brake 10 of a type disclosed in U.S. Pat. No. 7,100,997 including a decompression means according to the invention for use in a motor vehicle.

The boosted brake 10 comprises a pneumatic brake booster 12 through which an output force is created activate a master cylinder in response to an input force.

The booster 12 has a rigid casing 16 in which a transverse movable partition 18 that sealably delimits a front chamber 20, that is subjected to a first pressure "P1", from a rear chamber 22, that is subjected to a second pressure "P2" varying between the first pressure "P1" and a pressure "Pa", wherein the first pressure "P1" is greater than the second pressure "P2" to develop an output force.

The booster 12 includes a output push rod 24 with a rear or first end 26 connected to the moving partition 18 and a front or second end 25 through which a primary piston of the master cylinder is supplied with an actuation force. The first end 26 abuts a cylindrical body or sleeve 100 that engages a reaction disc 28 that is housed in a bore 30 in the movable partition 18.

A control rod 32 selectively moves a three-way control valve 40 retained in bore 30 of the movable partition 18 as a function of an axial input force that urges its front end toward the master cylinder in opposition to a return force of a return spring 34 and on activation a reaction force from the master cylinder.

The control valve 40 has a first plunger 36 that is located in front of the control rod 32 with a rear end 38 that forms an annular rear seat 41 for the three-way control valve 40. The first plunger 36 is progressively moved between a first position in which, with the control rod 32 at rest, the front chamber 20 and the rear chamber 22 are in communication with each other and to a second position in which, with the control rod 32 actuated and the second pressure "P2" prevailing in the rear chamber 22 increases as the control valve 40 places the rear chamber 22 in communication with the pressure "Pa" (atmospheric pressure) which is greater than the first pressure "P1" (vacuum).

The booster 12 includes a second plunger or feeler 42 (could be a separate cylindrical piece) that extends from the front end of the first plunger 36 and is located in a small diameter or bearing segment 44 of bore 30 in the movable partition 18. With the control rod 32 in the rest position, as shown in FIG. 1, a defined jump distance is defined between a front face 39 of the second plunger or feeler 42 and the reaction disc 28. When the control rod 32 moves in response an actuation or input force whose intensity is greater than a first defined intensity and spans the jump distance, face 39 comes into contact with the reaction disc 28 such that any reaction force developed in the movement of the master piston of the master cylinder is transmitted through the decomposition means 80, reaction disc 28 and into plunger 36 and the control rod 32.

The ratio of the area of the reaction disc 28 in contact with the face 46 of a piston 45 of the decomposition means 80 to the area of the face 39 of the plunger 42 in contact with the reaction disc 28 defines a first defined boost ratio.

When the control rod is actuated rapidly with an input force with an intensity greater than the first defined intensity, a delay in the balancing of the pressures between the front chamber 20 and rear chamber 22 provides the output rod 24 with a boost corresponding to the driver's braking force to overcome the reaction force that the master cylinder 14 exerts on the input push rod 32 by way of the reaction disc 28.

The control valve 40 and decompression piston 45 normally move in unison however, when the control rod 32 is actuated with an input force whose intensity is greater than a second defined intensity greater than the first intensity piston 45 of the decompression means 80 independently moves within the cylindrical body 100 to provide an additional volume that allows the reaction disc 28 to expand with respect to the plunger 42.

In this way, a rear part of the reaction disc 28 is decompressed an amount equal to the area of the plunger 42, which makes it possible to reduce the reaction force transmitted to the plunger or feeler 42 by way of the rear face 29 of the reaction disc 28.

The area of the face 39 of plunger 42 in contact with the reaction disc 28 is small and as a result the defined boost ratio increases. This second boost ratio is therefore greater than the first boost ratio.

A retainer or clip 41 that is attached to the head 25 of the output push rod 24 cages a retain spring 70 with respect to the head 26 of the output push rod 24. The head 26 is retained in diameter or opening 102 in the cylindrical member 100 such that face 39 is aligned in a same plane as face 46 with respect to face 27 on the reaction disc 28.

The use of piston 45 of the decompression means 80 of the present invention makes it possible to use a helical spring 70 that has a sufficiently small diameter 31 to be aligned in bore 30 in movable wall 18 by guide fingers 33 that engage push rod 24 and as a result the push rod 24 is held in axial alignment with the axis of the master piston of the master cylinder.

The helical spring 70 is caged onto the output push rod 24 to control movement of the decompression piston or wall 45. When the control rod 32 is actuated with an input force whose intensity is greater than a second defined intensity greater than the first intensity, the piston 45 of the decompression means 80 moves in opening or bore diameter 102 of the cylindrical body 100 and thereby creates an additional volume for a portion of the front face 27 of the reaction disc 28 to expand and reduce the reaction force transmitted to the plunger 42 by way of the rear face 29 of the reaction disc 28.

More particularly, according to the invention, the output push rod 24 that is interposed between the reaction disc 28 and the primary piston of the master cylinder 14, piston 45 of the decompression means 80 and cylindrical body 100 for boosted brake 12 are illustrated in greater detail in FIGS. 2 through 5.

The output push rod 24 illustrated in FIGS. 3, 4 and 5 has a rear end or head 26 with a rear face 19 arranged to contact shoulder 104 of the cylindrical member or sleeve 100 and a stem 66 that extends to the front end 25. The head 26 has a plurality of openings 72,72',72" that axially extend through the head 26 and connect with corresponding arcuate segment 74,74'74" located on the stem 66 as shown in FIGS. 3,4 and 5. A retainer disc 76 is located on stem 66 and receives a first end 71 of helical spring 70 while a second end 73 contacts clip or retainer sleeve 41 located on the front end 25 of push rod 24. A force is applied to the retainer sleeve 41 to compress the helical spring 70 and establish and maintain a preload on helical spring 70 by crimping a portion of the retainer sleeve 41 into groove 65 on stem 66.

The diameter "E" of the decompression piston 45 is substantially equal to the inside diameter of the helical spring 70 with the retainer disc 76 providing a base for end 71 of the helical spring 70. The decompression piston 45 has a cylindrical body 67 with radial projections or branches 64, 64', 64"

that extend through corresponding openings 72, 72'72" located in head 26 on a radii from the axis of the stem 66 with a portion thereof being located in the arcuate segments 74, 74', and 74". The arcuate segments 74, 74', 74" have a combined area with respect to the cross sectional of the stem such that the area of the stem 66 at any radial position along the axis of the stem 66 is not reduced more than five percent and preferably less than three percent such that the compression strength of the stem 66 is not substantially reduced. By matching the diameter of the helical spring 70 with the diameter of the cylindrical body 67 of the decompression piston or wall 45 a smoother transition occurs in the development of an output force transmitted through output push rod 24 in response to an emergency brake application high input force. In addition, the invention provides a boosted brake 10 with a decompression piston 45 of maximum transverse size "E" since the retainer disc 76 compensates for a reduction in an equal diameter, the compensation corresponding to the depth of the arcuate segments 74,74',74" from the peripheral surface of the stem 66 such that the diameter of push rod 24 is of minimum diameter and helical spring 70 is of a maximum diameter corresponding to the diameter "D" of the bore 30 in the movable wall 18.

The plurality of radial branches 64,64',64" of the decompression piston 45 are distributed angularly in a regular manner about the axis of the decompression piston 45, as best seen in FIG. 5 but it is envisioned that the number of branches could be increased to any number greater that three as long as the resulting decrease in the strength in the output push rod 24 is not impacted.

Mode of Operation

The boosted brake 10 functions in a manner as disclosed in U.S. Pat. No. 7,100,997 in that in an initial position of rest, as represented in FIG. 1, no or zero input force, or a force whose intensity is smaller than a first defined intensity, is applied to the control rod 32. In the rest position, the face of second plunger 42 does not act on the reaction disc 28 and as it is located at a distance "d" (jump distance) from the reaction disc 28. The front chamber 20 and rear chamber being in communication with each other and at a same pressure P1.

When an input force is applied to the control rod 32 with an input force whose intensity is greater than the first defined intensity and smaller than a second defined intensity, the first plunger 36 moves to close the communication between the front chamber 20 and rear chamber 22 and open communication with rear chamber 22 and the atmosphere to allow pressure Pa to create a pressure differential across the movable wall 18. The resulting actuation force is transmitted through the reaction disc 28 into cylindrical body 102 to head 26 to be transmitted as an output force to move piston 54 in the master cylinder. In this configuration, the reaction disc 28 is deformed and the jump distance "d" separating the reaction disc 28 from the plunger 42 eliminated as spring 70 holds decomposition piston 45 against face 27 of the reaction disc 28 in order to directly transmit the input force to the master piston according to a first defined boost ratio. In this configuration, since the input force is smaller than the preload of the spring 70, the decompression piston 45 is not acted upon and remains in alignment with the rear face 27 of the reaction disc 28. The reaction disc 28 transmits the whole of the reaction of the master cylinder to the second plunger 42 for communication back to the input rod 32 by way of the first plunger 36.

When an input force is applied to the control rod 32 with an input force whose intensity is greater than the second defined intensity, the actuation force received by the reaction disc 28 acts on the face 46 of the piston 45 and overcomes the antagonistic force of the spring 70 by moving in bore diameter 106 of the sleeve or cylindrical body 100. The piston 45 on moving in bore diameter 106 allows a portion of face 27 of the reaction disc 28 to correspondingly move into bore diameter 106 and increase the volume in which the reaction disc 28 may occupy. Thus the resulting input force is transmitted to the primary piston according to the second defined boost ratio, which is greater than the first. The reaction disc 28 no longer transmits more than a fraction of the reaction of the master cylinder to the second plunger or feeler 42.

Advantageously, face 46 of the piston 45 engages face 19 on the head 26 of push rod 24 to define an axial stop to limit the modification of the input force with respect to the second boost ratio.

What is claimed is:

1. A boosted brake (10) for a motor vehicle having a pneumatic brake booster (12) for providing a master cylinder with an actuation force, said booster (12) comprises a rigid casing (16) in which a transverse partition (18) slides and sealably delimiting a front chamber (20) subjected to a first pressure (P1) from a rear chamber (22) subjected to a second pressure (P2) that varies between the first pressure (P1) and an actuation pressure (Pa) that is greater than the first pressure (P1), a output push rod (24) connected to the moving partition (18) having a front end that acts on a primary piston of the master cylinder and a rear end retained in a bore (30) of the movable partition (18), a reaction disc (28) interposed between the moving partition (18) and a head (26) on the rear end of the output push rod (24) through which an output force is communicated to the master cylinder in response to an input force applied to a control valve (40) by an input member (32), said input member (32) selectively moving in the bore (30) as a function of the input force exerted on a return spring (34) acting against the input force applied to the input member (32), said control valve (40) having a first plunger (36) that is located in front of the input member (32) and having an annular rear seat for a poppet of the control valve (40), said first plunger being progressively moved between a position in which the input member (32) at rest and the front chamber (20) and the rear chamber (22) are in communication with each other to an actuation position in which the second pressure (P2) prevailing in the rear chamber (22) is increased as the plunger moves off the rear seat of the poppet to place the rear chamber (22) in communication with the actuation pressure (Pa) which is greater than the first pressure (P1), a second plunger that extends from the front end of the first plunger (36) and is located in a diameter (44) of bore (30) to defined a distance (d) between a face (44) thereon and the reaction disc (28) such that when the control rod (32) is actuated with an input force whose intensity is greater than a first defined intensity the face (39) comes into contact with the reaction disc (28) and transmit a reaction force from the head (26) of the output push rod (24) to the first plunger (36) and to the input member (32), the ratio of the area of the reaction disc (28) in contact with the movable partition (18) to the area of the second plunger (42) in contact with the reaction disc (28) defining a first defined boost ratio, and a decompression means (80) which, when the input member (32) is actuated with an input force whose intensity is greater than a second defined intensity moves to create an additional volume in which a portion of a front face (27) of the reaction disc (28) expands and thereby reduces the reaction force transmitted to the second plunger (42) by way of the rear face (29) of the reaction disc (28), the ratio of the area of the reaction disc (28) in contact with the movable partition (18) to the area of the decompression means (80) in contact with the reaction disc

(28) in contact with the reaction disc (28) defining a second boost ratio, which is greater than the first boost ratio, characterized in that the decompression means (80) is defined by the relationship between the output push rod (24), a spring (70), piston (45) and a sleeve (100) wherein the head (26) of the output push rod (24) has a plurality of axial openings (72,72', 72') located at a defined radius from the axis of a stem (66) of the push rod (66) such that the an extension of the axial openings (72,72',72") create corresponding arcuate grooves (74,74',74") in the stem (66), said piston (45) having a cylindrical body (67) from which a plurality of radial projections (64,64',64") extend into said axial openings (72,72',72") and arcuate grooves (74,74',74"), said head (26) of said output push rod (24) and piston (45) being located in a sleeve (100) that abuts the reaction disc (28) such that a spring (70) retained on said output push rod (24) urges a face 46 in said piston (45) into contact with the reaction disc (28), said spring (70) having a maximum diameter corresponding to a diameter of the bore 30 in the movable wall 18 while said stem (66) having a minimum diameter matched with the diameter of said piston (45) to create the desired second boost ratio.

2. The boosted brake (10) according to claim 1, characterized in that said spring (70) has an end (71) that engages a retainer disc (76) that transmits a spring force into the plurality of radial projections (64,64',64") to position the face (46) of piston (45) in contact with the reaction disc (28).

3. The boosted brake (10) according to claim 2, further characterized by a clip (41) that is deformed into a groove (65) to hold an end (71) of the spring (70), said clip (41) by being selectively deformed permitting a variable return force to be created by the caging of the spring (70).

4. The boosted brake (10) according to claim 1 wherein the radius of said arcuate grooves (74,74',74") in said stem (66) do not reduce the effective cross sectional area more than 5 percent and as a result do not impact the axial strength of the output push rod (24) in a critical manner.

5. The boosted brake (10) according to claim 1 wherein the radius of said arcuate grooves (74,74',74") in said stem (66) do not reduce the effective cross sectional area more than 3 percent and as a result do not impact the axial strength of the output push rod (24) in a critical manner.

6. The boosted brake (10) according to claim 1 wherein said piston (45) has a diameter corresponding substantially to the effective diameter of said spring (70).

7. The boosted brake (10) of claim 1 wherein said movable partition (18) is characterized by a plurality of fingers (33) that engage and assist in maintaining said output push rod (24) in axial alignment with the master cylinder.

* * * * *